United States Patent
Takaoka et al.

(10) Patent No.: US 11,937,535 B2
(45) Date of Patent: Mar. 26, 2024

(54) MOWER UNIT

(71) Applicant: Kubota Corporation, Osaka (JP)

(72) Inventors: Masaki Takaoka, Sakai (JP); Junki Nakao, Sakai (JP); Akihito Mihara, Sakai (JP); Yusaku Matsuoka, Sakai (JP); Yuki Hirotsu, Sakai (JP)

(73) Assignee: Kubota Corporation, Osaka (JP)

( * ) Notice: Subject to any disclaimer, the term of this patent is extended or adjusted under 35 U.S.C. 154(b) by 374 days.

(21) Appl. No.: 17/348,058

(22) Filed: Jun. 15, 2021

(65) Prior Publication Data

US 2022/0192086 A1    Jun. 23, 2022

(30) Foreign Application Priority Data

Dec. 23, 2020  (JP) .................... 2020-213820

(51) Int. Cl.
  *A01D 34/00*  (2006.01)
  *A01D 34/66*  (2006.01)
  *A01D 101/00*  (2006.01)
  *A01D 34/06*  (2006.01)

(52) U.S. Cl.
  CPC ............ *A01D 34/003* (2013.01); *A01D 34/06* (2013.01); *A01D 2101/00* (2013.01)

(58) Field of Classification Search
  CPC ... A01D 34/003; A01D 34/66; A01D 2101/00
  USPC ........................................................ 56/255
  See application file for complete search history.

(56) References Cited

U.S. PATENT DOCUMENTS

| 2,936,563 | A | * | 5/1960 | Blume | ................. | A01D 34/003 |
| | | | | | | 239/DIG. 6 |
| 3,214,893 | A | | 11/1965 | Griffin | | |
| 3,568,421 | A | * | 3/1971 | Smith | .................... | A01D 34/63 |
| | | | | | | 56/255 |
| 8,087,221 | B2 | * | 1/2012 | Sugio | ................... | A01D 34/003 |
| | | | | | | 56/16.8 |
| 2011/0232250 | A1 | * | 9/2011 | Sugio | ................... | A01D 34/003 |
| | | | | | | 56/16.8 |
| 2017/0013780 | A1 | | 1/2017 | Ito et al. | | |
| 2019/0014718 | A1 | * | 1/2019 | Uemura | ................. | B60L 50/66 |

FOREIGN PATENT DOCUMENTS

| EP | 1166615 A1 * | 1/2002 | .......... A01D 34/003 |
| JP | 8294316 A | 11/1996 | |
| JP | 2011205946 A | 10/2011 | |

(Continued)

OTHER PUBLICATIONS

EP1166615A1 (Thorman et al.) (Jan. 2, 2002) (Machine Translation) (Year: 2002).*

*Primary Examiner* — Mahmoud Gimie
(74) *Attorney, Agent, or Firm* — The Webb Law Firm

(57) ABSTRACT

Provided are blades 22R, 22C, 22L rotatably driven about rotational axes XL, XC, XR to be able to cut grass on the ground surface, a housing covering the blades 22R, 22C, 22L and having a lower face thereof opened, a water feeding section provided outside the housing, a water discharging section 54 provided inside the housing for discharging cleaning water fed to the water feeding section, and a water feeding pipe 55 connected to/between the water feeding section and the water discharging section 54. The water discharging section 54 discharges water toward an inner wall face of the housing.

10 Claims, 7 Drawing Sheets

(56) References Cited

FOREIGN PATENT DOCUMENTS

| JP | 2011254765 A | 12/2011 | | |
|---|---|---|---|---|
| JP | 201718054 A | 1/2017 | | |
| WO | WO-2004098266 A1 | * | 11/2004 | ........... A01D 34/003 |

* cited by examiner

MOWER UNIT

CROSS-REFERENCE TO RELATED APPLICATION

This application claims priority to Japanese Patent Application No. 2020-213820 filed Dec. 23, 2020, the disclosure of which is hereby incorporated by reference in its entirety.

BACKGROUND OF THE INVENTION

Field of the Invention

The present invention relates to a mower unit having a plurality of blades which are disposed inside a housing and rotatably driven about vertical axes.

Description of Related Art

A mower unit may be provided with a water discharging section for discharging cleaning water supplied to a water feeding section towards the blades (see e.g. Patent Document 1 "Japanese Patent Application No. 2011-205946").

However, with the mower unit disclosed in Patent Document 1, when the inner wall of the housing is to be cleaned, water is discharged from the water discharging section toward the respective blades in association with rotation of the blades and water splashed back from the blades is stirred inside the housing, thereby to clean the inner wall of the housing. Namely, of the inner wall of the housing, portions thereof where a large mount of e.g. cut grass pieces is accumulated and portions thereof where only a small amount of cut grass pieces or the like is accumulated are cleaned indifferently by stirred water. As a result, although the accumulated cut grass pieces or the like may be removed sufficiently at the portions of small accumulation, the cut grass pieces or the like may sometimes remain unremoved at the portions of large accumulation. For allowing such cut grass pieces or the like to be removed, water discharging needs to be further continued, so the cleaning operation cannot be carried out in an efficient manner.

SUMMARY OF THE INVENTION

In view of the above, the object of the present invention is to provide a mower unit that allows a cleaning operation to proceed in an efficient manner.

A mower unit according to the present invention comprises:
  a blade rotatably driven about a rotational axis to be able to cut grass on the ground surface;
  a housing covering the blade and having a lower face thereof opened;
  a water feeding section provided outside the housing;
  a water discharging section provided inside the housing for discharging cleaning water fed to the water feeding section; and
  a water feeding pipe connected to/between the water feeding section and the water discharging section;
  wherein the water discharging section discharges water toward an inner wall face of the housing;
  wherein inside the housing, there is provided a vertical wall portion having an arcuate shape along an outer shape of a rotational trajectory of the blade;
  wherein the water discharging section is provided at a portion located in a space formed between the vertical wall portion and a lateral wall of the housing located on the side opposite the side where the blade is located;
  wherein the water feeding pipe includes a main water feeding pipe connected to the water feeding section and a branch water feeding pipe branching from the main water feeding pipe and connected to the water discharging section; and wherein the branch water feeding pipe is disposed in the space.

With the above-described configuration, the water discharging section discharges cleaning water toward the inner wall face of the housing. As the water discharging section discharges the cleaning water to the inner wall face of the housing, it becomes possible to clean with emphasis the inner wall face where cut grass pieces or like can be easily accumulated, e.g. the inner wall faces of corner portions between the ceiling wall and the side wall inside the housing. Further the cleaning water discharged toward the inner wall face will be splashed back from the inner wall face to hit the blade, whereby the cleaning water will be stirred inside the housing. Therefore, while the portion of the inner wall face of the housing where the cut grass pieces or the like can be easily accumulated is cleaned with emphasis, the entire inner wall of the housing can be cleaned, so the cleaning operation can proceed in an efficient manner.

Moreover, with the above-described configuration, since the water discharging section is provided in the space formed between the vertical wall portion and the rear wall portion, adherence of cut grass pieces or the like to the water discharging section can be suppressed and it is also possible to suppress occurrence of collision of small stones or the like bounced off by the blade against the water discharging section to damage this water discharging section.

Further, with the above-described configuration, it is possible to arrange such that a plurality of branch water feeding pipes are connected to and branch from the main water feeding pipe, whereby the cleaning water can be fed from one water feeding section to a plurality of water discharging section. Moreover, as the branch water feeding pipe is disposed in the space between the vertical wall portion and the rear wall portion, it is possible to suppress occurrence of collision of small stones or the like bounced off by the rotatably driven blade against the branch water feeding pipe to damage this branch water feeding pipe.

In the present invention, preferably, the water discharging section discharges water toward a ceiling face of the inner wall face.

With the above-described arrangement, the cleaning water discharged against the ceiling face of the housing will drop onto the blade or the cleaning water will flow on/along the side wall portion or the front and rear wall portions of the housing. As a result, it becomes possible to clean not only the ceiling face of the housing, but also the side wall portion, the front and rear wall portions, etc. of the housing as well as the blade.

In the present invention, preferably, the water discharging section discharges water toward at least a portion of the inner wall face overlapped with the rotational trajectory of the blade as seen in a plan view.

With the above-described arrangement, the cleaning water discharged against the ceiling face will drop onto the blade. As a result, the blade will be cleaned by the cleaning water dropped onto the blade. Moreover, in case the blade is being rotatably driven, the cleaning water will be stirred by the rotatably driven blade, so that the inside of the housing can be cleaned.

In the present invention, preferably:
inside the housing, there is provided a vertical wall portion having an arcuate shape along an outer shape of the rotational trajectory of the blade; and
the water discharging section is provided at a portion located in a space formed between the vertical wall portion and a lateral wall of the housing located on the side opposite the side where the blade is located.

In the present invention, preferably:
the water feeding pipe includes a main water feeding pipe connected to the water feeding section and a branch water feeding pipe branching from the main water feeding pipe and connected to the water discharging section; and the branch water feeding pipe is disposed in said space.

In the present invention, preferably:
the main water feeding pipe includes a branch connecting portion formed integrally with the main water feeding pipe, to which the branch water feeding pipe is connected;
the branch connecting portion is provided under an inclined state progressively away from the main water feeding pipe from a branching point toward the downstream side in a water flowing direction of the main water feeding pipe.

With the above-described arrangement, the cleaning water fed from the water feeding section will flow through the main water feeding pipe and fed from the main water feeding pipe via the branch connecting portion to the branch water feeding pipe. Here, since the branch connecting portion is provided under an inclined state inclined on the downstream side of the water flowing direction, the cleaning water can smoothly flow into the branch connecting portion from the main water feeding pipe. As a result, it is possible to prevent decrease in the momentum of the flowing of the cleaning water at the branching point.

In the present invention, preferably, the water feeding section is provided upwardly of the housing and on one side in the width direction of the housing.

With the above-described arrangement, since the water feeding section is provided on one side in the width direction of the housing, access to this water feeding section is made easier than an arrangement of it being provided at the center in the width direction of the housing. Moreover, since it is provided upwardly of the housing, the access to the water feeding section is made even easier. As a result, when a hose or the like is to be connected to the water feeding section, a worker can carry out this connecting operation easily.

In the present invention, preferably:
in an outer wall face of the housing, there is provided a protection portion for protecting the water feeding section.

With the above-described arrangement, even when a tree, a rock, etc. may hit the housing during a reaping work, the water feeding section is protected by the protection portion, so damage of the water feeding section due to such collision or the like can be suppressed.

In the present invention, preferably:
the protection portion includes a first protection member and a second protection member disposed adjacent the water feeding section;
the first protection member and the second protection member are disposed such that the water feeding section is located between the first protection member and the second protection member as seen in a plan vie; and heights of upper ends of the first protection member and the second protection member are higher than a height of an upper end of the water feeding section.

With the above-described arrangement, the water feeding section is protected by a simple arrangement of it being protected by the two protection members consisting of the first protection member and the second protection member. Further, since the water feeding section is located between the first protection member and the second protection member and the heights of the upper ends of the first protection member and the second protection member are higher than the height of the upper end of the water feeding section, even if a worker tramps down the housing erroneously, the water feeding section will be protected.

In the present invention, preferably:
the water feeding section is configured to discharge water toward the direction along a flowing direction of air current generated in association with rotation of the blade.

With the above-described arrangement, cleaning water discharged from the water discharging section will increase in its momentum by the air current generated in association with the rotation of the blade. And, with this cleaning water increased in its momentum, the inside of the housing can be cleaned in a favorable manner.

In the present invention, preferably:
there is provided a support member for supporting the water discharging section to the housing; and
the support member has an elongate hole for insertion of a bolt for fixing and fastening the support member to the housing, the support member being adjustable in its posture within the range of the hole of the elongate hole.

In the present invention, preferably, the water feeding section is provided in a front side wall of the housing.

DETAILED DESCRIPTION OF THE PREFERRED EMBODIMENTS

Next, a mower unit relating to the present invention will be explained with reference to the accompanying drawings, by way of an example in which the mower unit is mounted on a riding grass mowing machine called a zero-turn mower. In this embodiment, when the front/rear direction of the machine body is to be defined, this definition will be made along the machine body advancing direction at a utility work state. Whereas, when the left/right direction of the machine body is to be defined, this definition will be made as seen in the machine body advancing direction. Namely, the direction denoted with a sign (F) in FIG. 1, etc. will be defined as the machine body front side, the direction denoted with a sign (B) in FIG. 1, etc. will be defined as the machine body rear side, the direction denoted with a sign (L) in FIG. 2, etc. will be defined as the machine body left side, and the direction denoted with a sign (R) in FIG. 2, etc. will be defined as the machine body right side, respectively.

[General Configuration]

Figure 1:
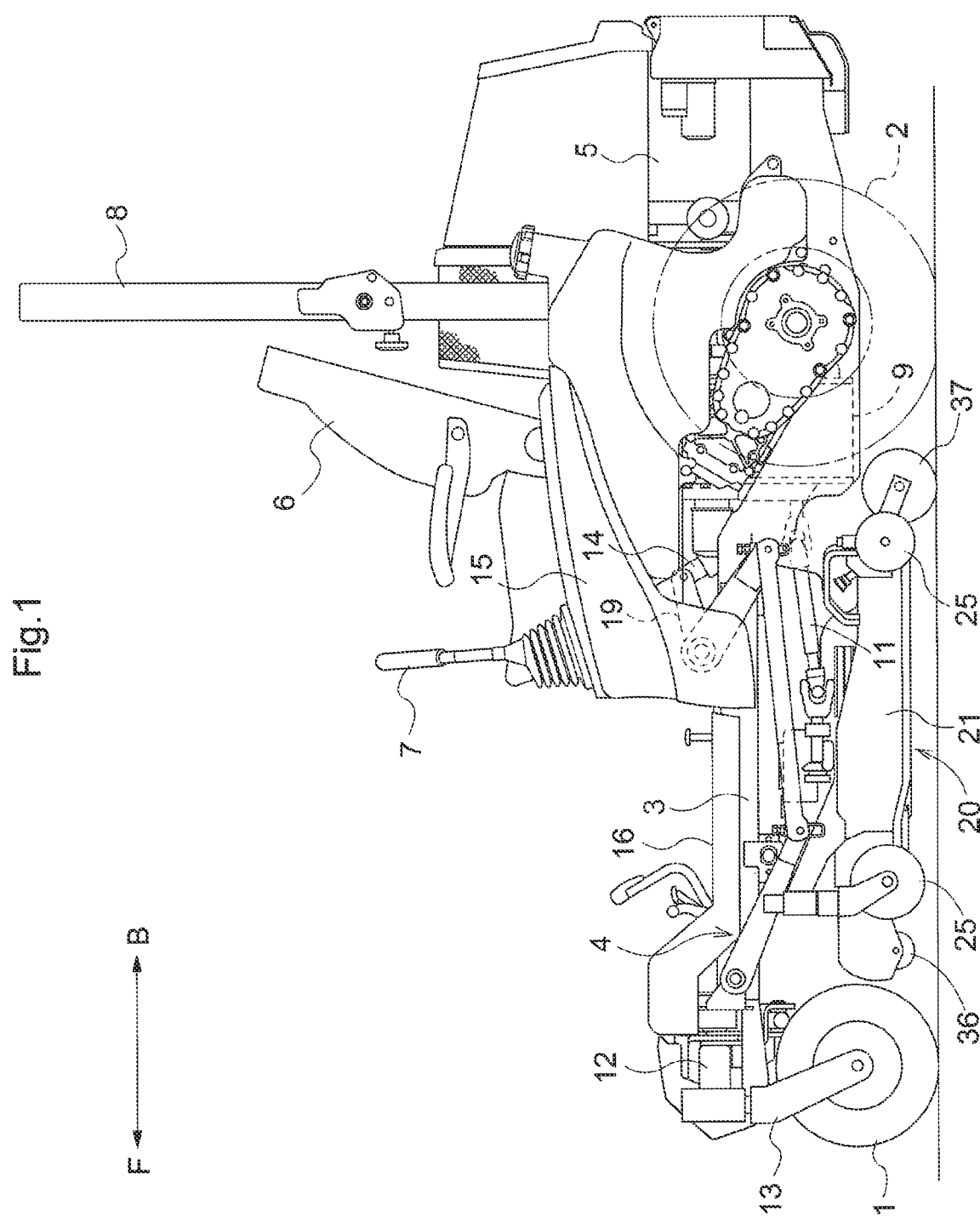
FIG. 1 is an overall side view of a riding grass mowing machine.
Figure 2:
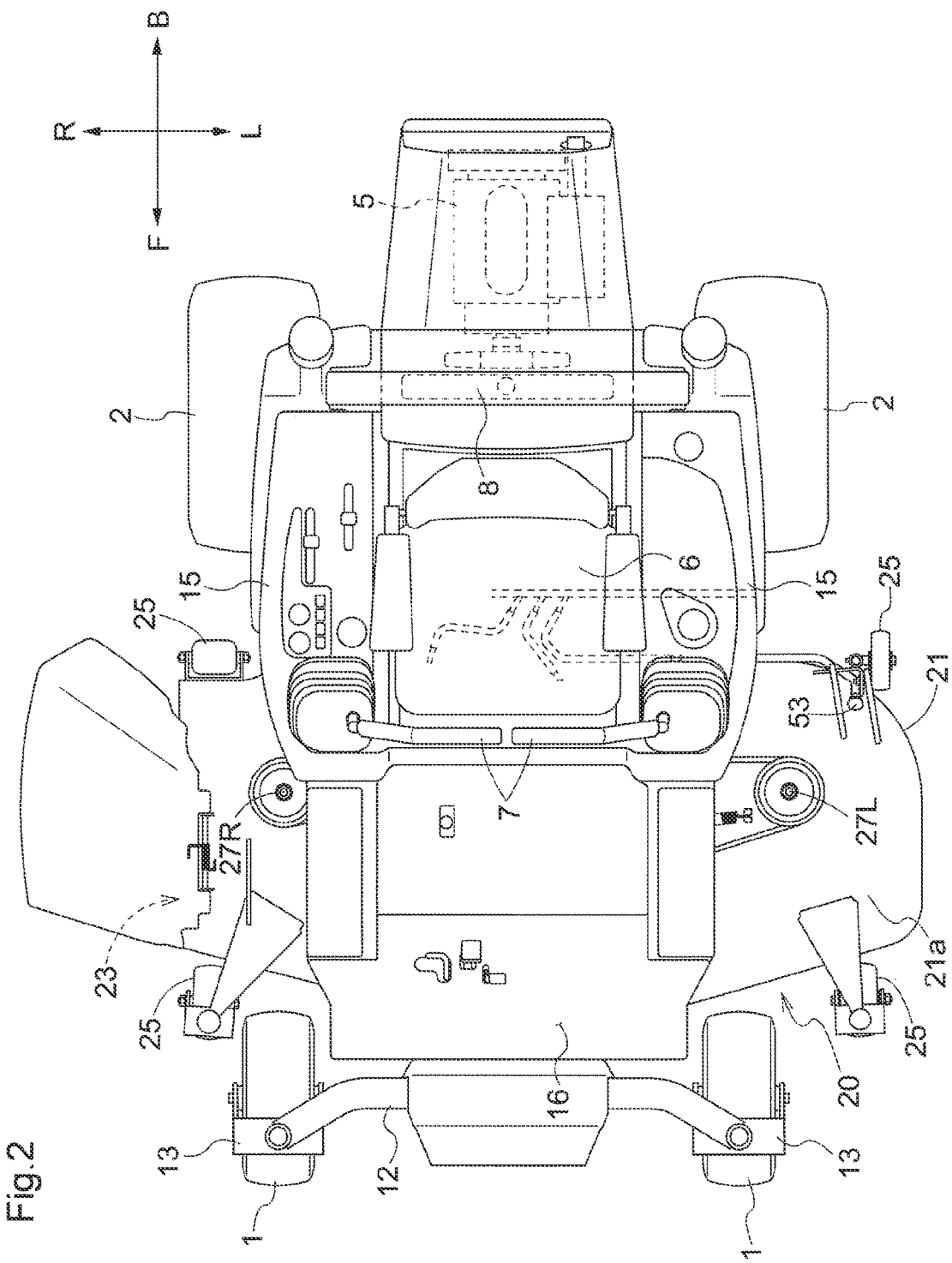
FIG. 2 is an overall plan view of the riding grass mowing machine.

As shown in FIG. 1 and FIG. 2, in this embodiment, a mower unit 20 is a side-discharge mower configured such that a traveling machine body includes left and right front wheels 1 and left and right rear wheels 2, and between the front wheels 1 and the rear wheels 2 of a vehicle body frame 3 of this traveling machine body, the mower unit 20 is mounted via a link mechanism 4 to the lower side of a driving section floor 16.

The traveling machine body includes, in addition to the left and right front wheels 1 and the left and right pair of rear wheels 2, an engine section having an engine 5 and provided at a rear portion of the vehicle body, a driving section having a driver's seat 6 and a pair of left and right maneuvering levers 7, a ROPS (Roll-Over Protective Structure) frame 8 disposed adjacent the rear side of the driver's seat 6, a transmission device 9 supporting the left and right rear wheels 2, and a rotational shaft 11 for transmitting driving power of a PTO shaft 10 disposed at a front portion of the transmission device 9 to a blade driving mechanism 30 of the mower unit 20.

The left and right front wheels 1 are supported to an end portion of a front wheel support frame 12 coupled to a front portion of the vehicle body frame 3 to be pivotable about a vertical axis via front wheel support forks 13. The left and right front wheels 1 are freely pivoted relative to the front wheel support frame 12 together with the front wheel support forks 13. The left and right rear wheels 2 are driven independently of each other by a pair of hydrostatic stepless speed changer device (not shown) included in the transmission device 9 and are speed-changed independently of each other to the forward traveling side and reverse traveling side and also stopped by separate speed changing operations of the pair of hydrostatic stepless speed changer devices by the pair of left and right maneuvering levers 7.

The link mechanism 4 is configured as follows. Namely, a single-action type lift cylinder 14 is coupled to a drive arm 19 connected to the link mechanism 4 and as the lift cylinder 14 is expanded with feeding of pressure oil thereto, the link mechanism 4 is elevated relative to the vehicle body frame, whereas as the cylinder is contracted with discharging of pressure oil therefrom, the link mechanism 4 is lowered by the weight of its own relative to the vehicle body frame 3.

Namely, by contracting and expanding the lift cylinder 14, the mower unit 20 can be lowered to a work posture where left and right gauge wheels 25 provided rearwardly of the mower unit 20 are placed in approximate contact with the ground surface for effecting a reaping work or the mower unit 20 can be elevated to a non-work posture where the gauge wheels 25 are lifted off the ground surface not to effect any reaping work.

When the mower unit 20 is set to the work posture and the traveling machine body is caused to travel, the mower unit 20 will effect a reaping work of reaping grass or lawn by means of three blades 22L, 22C, 22R disposed inside a housing 21, and cut grass pieces will be conveyed by air current generated in association with rotation of each blade 22L, 22C, 22R to a discharge opening 23 disposed at the right end of the housing 21 to be discharged to the outside of the traveling machine body.

[Arrangement of Mower]

Figure 3:
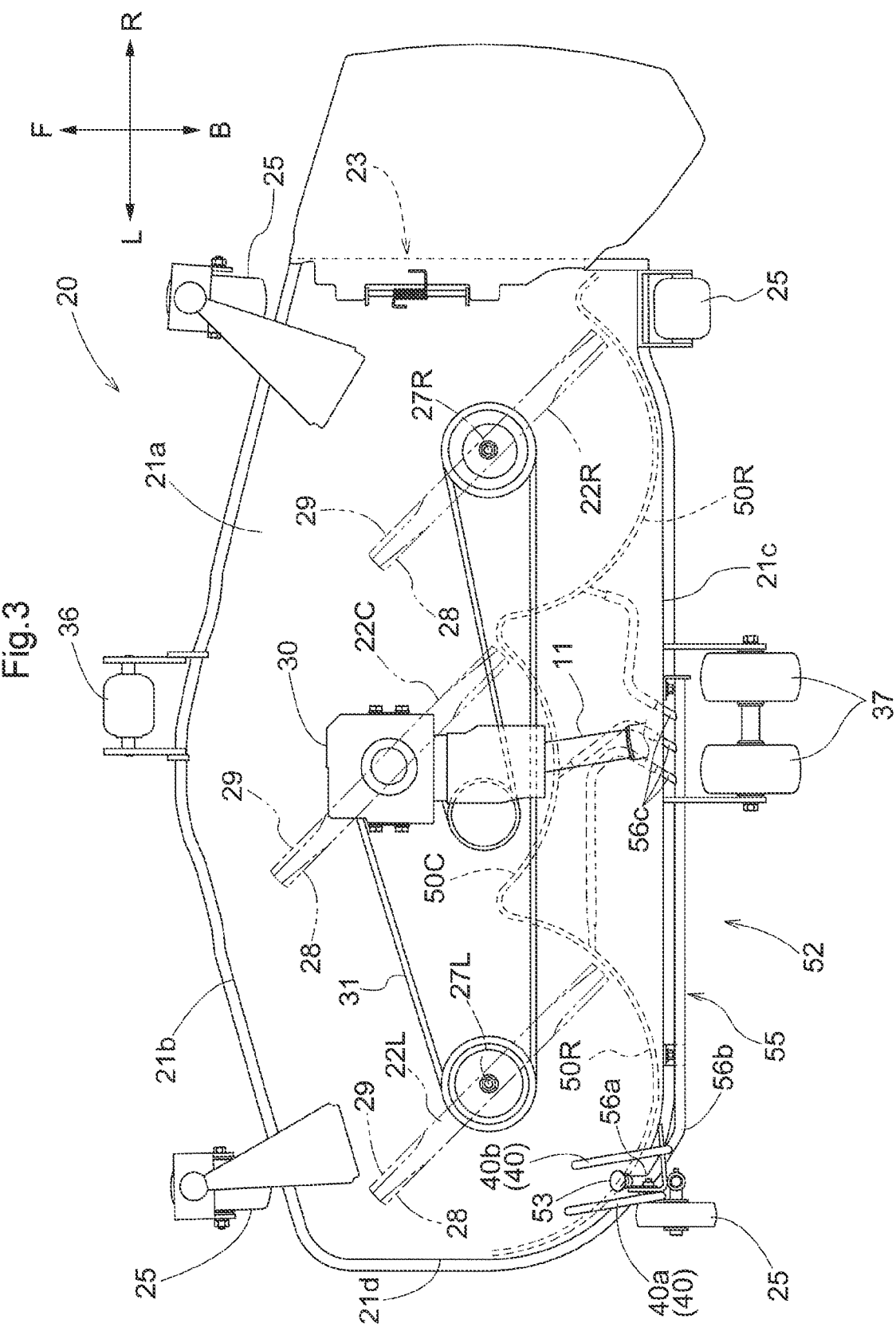
FIG. 3 is a plan view of a mower unit.
Figure 4:
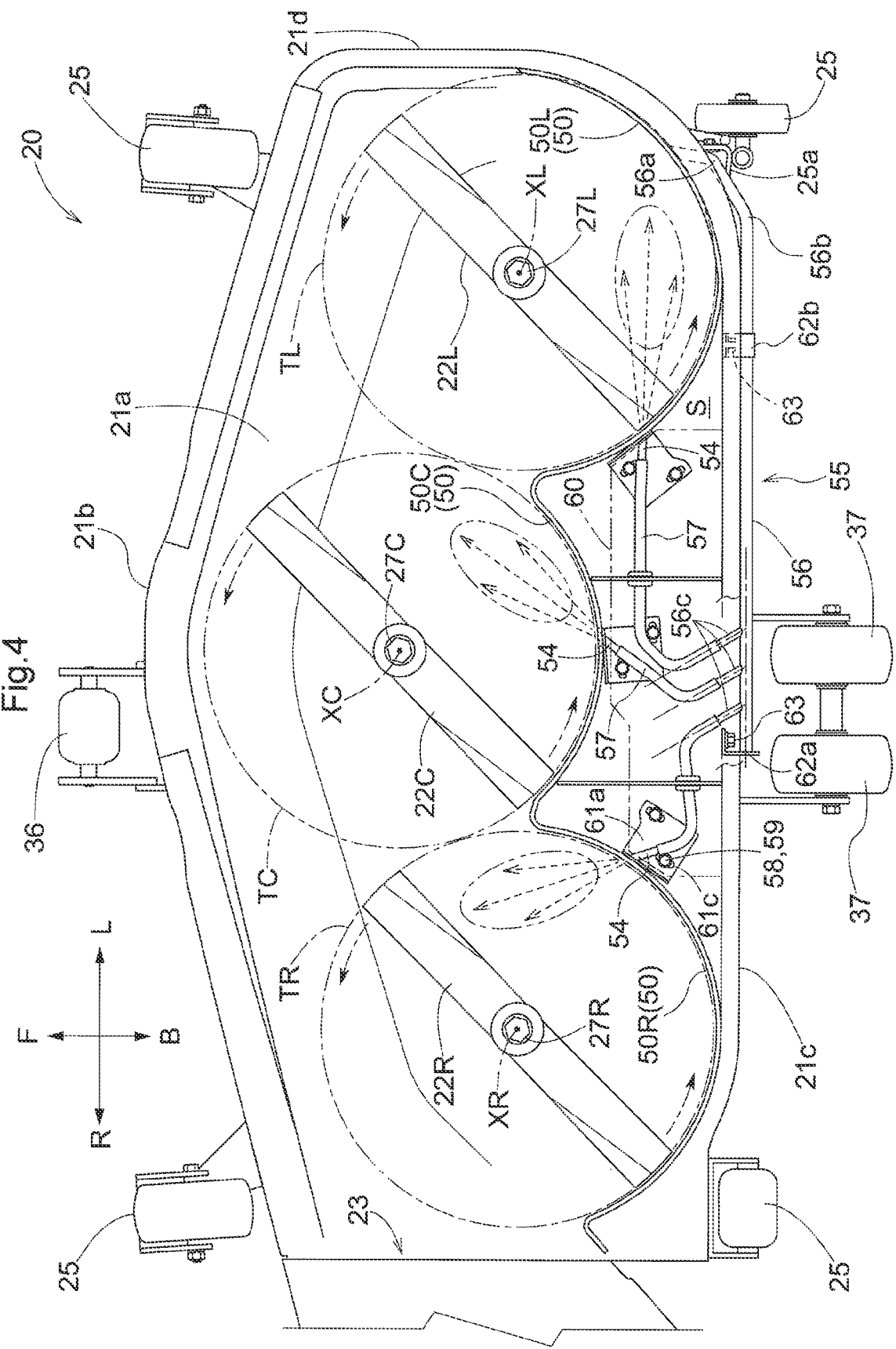
FIG. 4 is a lower side view of the mower.

As shown in FIG. 3 and FIG. 4, the mower unit 20 includes, in addition to the housing 21, the three blades 22R, 22C, 22L and the gauge wheels 25, a vertical wall portion 50 having an arcuate shape along the outer shape of the rotational trajectories of the respective blades 22R, 22C, 22L, the discharge opening 23 formed at the right end of the housing 21, a ground contacting roller 36 disposed forwardly of the housing 21, and a pair of ground contacting rollers 37 disposed rearwardly of the housing 21.

As shown in FIG. 3, of the left and right gauge wheels 25 disposed rearwardly of the mower unit 20, the left gauge wheel 25 is disposed on the left rear side of the housing 21 and supported to a support member 25a having an approximately L-shape as seen in a plan view. The right gauge wheel 25 is disposed on the right rear side of the housing 21.

The ground contacting roller 36 is disposed forwardly of the center portion in the width direction of the housing 21. The pair of ground contacting rollers 37 are disposed rearwardly of the center portion in the width direction of the housing 21 and disposed side by side in the width direction of the housing 21.

As shown in FIG. 3 and FIG. 4, the housing 21 is constituted of a ceiling wall 21a and a side wall and configured to cover the blades 22R, 22C, 22L and to have its lower face opened. The side wall is constituted of a front side wall 21b extending from the front edge portion of the ceiling wall 21a downwardly of the housing 21, a rear side wall 21c extending from the rear edge portion of the ceiling wall 21a downwardly of the housing 21 and a lateral side wall 21d extending from the lateral end portion of the ceiling wall 21a downwardly of the housing 21.

The discharge opening 23 is formed by the right end of the ceiling wall 21a, the right end of the front side wall 21b and the right end of the vertical wall portion 50.

The rear side wall 21c is provided along the respective rear ends of arcuate portions 50R, 50L on the right and left sides of the vertical wall portion 50 and rearwardly of the arcuate portions 50R, 50C, 50L. Incidentally, the rear end of the arcuate portion 50C is located forwardly of the rear side wall 21c.

The three blades 22R, 22C, 22L are disposed inside the housing 21 and side by side in the width direction thereof. The three blades 22R, 22C, 21L are arranged in a triangular layout as seen in a plan view, with the blade 22C located at the center in the width direction of the housing 21 of the three blades 22R, 22C, 22L being slightly offset to the front side. The blade 22L is present most distantly from the discharge opening 23 and located on the most upstream side in the cut grass flowing direction. The blade 22R is located nearest the discharge opening 23 and on the most downstream side in the cut grass flowing direction.

The blades 22R, 22C, 22L respectively are rotatably supported to lower end portions of drive shafts 27L, 27C, 27R which are rotatably supported to the ceiling wall 21a of the housing 21 via unillustrated support members constituted of bearing support cases. With this arrangement, the blades 22R, 22C, 22L respectively are rotatably driven together with the drive shafts 27L, 27C, 27R about rotational axes XR, XC, XL extending along the vertical direction of the housing 21. Incidentally, each one of the blades 22R, 22C, 22L includes cutter blades 28 provided at its opposed ends and wind generating blades 29 provided on the rear sides of the respective cutter blades 28.

The vertical wall portion 50 has an arrangement that arcuate portions 50R, 50C, 50L thereof coaxial with rotational axes XR, XC, XL of the respective blades 22R, 22C, 22L are disposed side by side along the rotational trajectories TR, TC, TL of the blades 22R, 22C, 22L and at the left/right center, there is formed a receded portion formed of the three arcuate portions 50R, 50C, 50L. A lid body 60 is provided to extend forwardly from the lower end of the vertical wall portion 50 in such a manner as to cover a space S formed between the vertical wall portion 50 and the rear side wall 21c.

The driving power from the engine 5 (see FIG. 1) is transmitted to the blade driving mechanism 30. Then, the driving power transmitted to the blade driving mechanism 30 drives the drive shaft 27C of the blade 22C and drives also the respective drive shafts 27R, 27L of the blades 22R, 22L via a belt 31 wound around all the three drive shafts 27L, 27C, 27L. With this arrangement, the respective blades 22R, 22C, 22L are rotatably driven about the respective rotational axes XL, XC, XR as indicated by arrows in FIG. 4.

Cut grass pieces cut by the respective blades 22R, 22C, 22L are conveyed by wind generated by the wind generating blades 29 of the respective blades 22R, 22C, 22L inside the housing 21 toward one lateral end side thereof where the discharge opening 23 is located and discharged via this discharge opening 23 to the lateral outer side of the housing 21.

[Arrangement of Cleaning Device]

As shown in FIGS. 3 and 4, a cleaning device 52 includes a single water feeding section 53 for feeding cleaning water, three water discharging sections 54 for discharging the cleaning water to the inner wall face (corresponding to what is referred to as "ceiling face" in this invention) of the ceiling wall 21a of the housing 21, a water feeding pipe 55 connected to/between the water discharging sections 54 and the water feeding section 53.

As shown in FIG. 3, the water feeding section 53 is supported to the water feeding pipe 55. The water feeding pipe 55 is disposed upwardly of the housing 21 and at a position on the left side in the width direction of the housing 21.

On the outer wall face of the housing 21, there is provided a protection portion 40 for protecting the water feeding section 53. In this embodiment, the protection portion 40 is constituted of a first protection member 40a provided on the left side of the water feeding section 53 in the width direction thereof and a second protection member 40b provided on the right side of the water feeding section 53 in the width direction thereof. Namely, an arrangement is made such that the water feeding section 53 is located between the first protection member 40a and the second protection member 40b as seen in a plan view.

Each one of the first protection member 40a and the second protection member 40b is constituted of a bar-like member and provided in the form of a bridge extending from a more front side than the water feeding section 53 to the left support member 25a. The first protection member 40a and the second protection member 40b are formed such that heights of the upper ends of the first protection member 40a and the second protection member 40b are higher than the height of the upper end of the water feeding section 53.

As shown in FIG. 3 and FIG. 4, the water feeding pipe 55 includes a main water feeding pipe 56 connected to the water feeding section 53 and three branch water feeding pipes 57 branching from the main water feeding pipe 56 and connected respectively to the water discharging sections 54.

Figure 6:
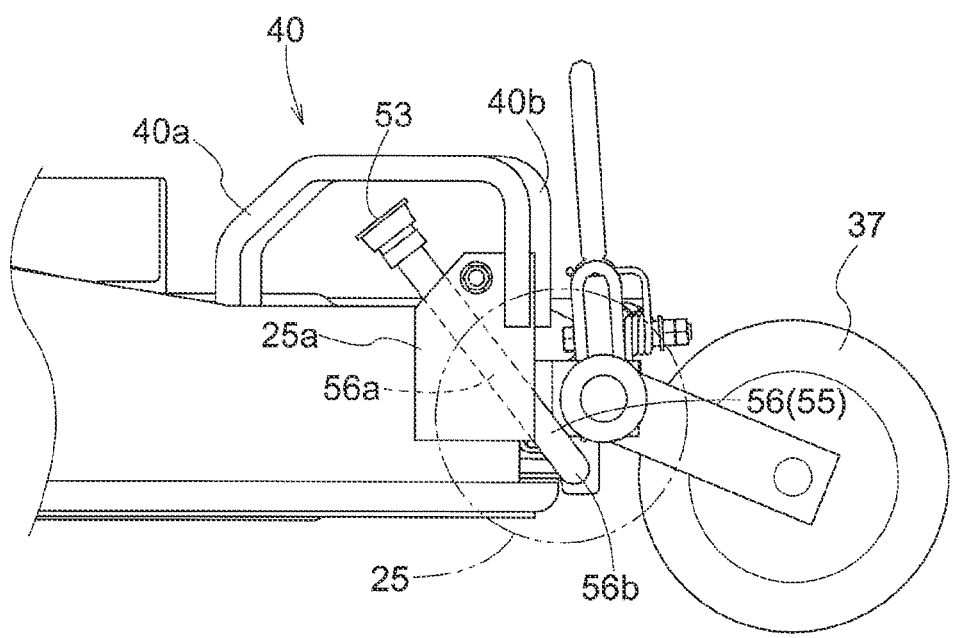
FIG. 6 is a side view showing an arrangement of the water discharging section.

As shown in FIG. 3 and FIG. 6, the main water feeding pipe 56 extends rearwards and downwards from the water feeding section 53 and is bent at a first bent portion 56a adjacent the ceiling wall 21a of the housing 21. Further, the main water feeding pipe 56 extends from the first bent portion 56a to the rear side of the rear side wall 21c and is bent at a second bent portion 56b and extends in the horizontal direction on the rear side of the rear side wall 21c.

In the water feeding pipe 55, there are provided a stay 62a at the downstream end portion in the water flowing direction of the main water feeding pipe 56 and a stay 62b at a position located between the second bent portion 56b of the main water feeding pipe 56 and the stay 62a. The stays 62a, 62b define bolt holes (not shown) and as these bolt holes and fastening holes (not shown) formed at portions of the rear side wall 21c corresponding to the bolt holes are fastened by a bolt 63 to each other, the water feeding pipe 55 is supported to the rear side wall 21c.

As shown in FIG. 4, the main water feeding pipe 56 includes three branch connecting portions 56c which branch from the main water feeding pipe 56 and to which the branch water feeding pipes 57 are respectively connected. The branch connecting portions 56c are formed integrally with the main water feeding pipe 56 and provided under an inclined state progressively away from the main water feeding pipe 56 toward the water flowing direction downstream side of the main water feeding pipe 56 from the branching point from the main water feeding pipe 56.

The branch water feeding pipes 57 are constituted of flexible connection pipes such as rubber hoses, vinyl hoses, or the like and connected between respective leading end portions of the plurality of branch connecting portions 56c provided in the main water feeding pipe 56 and the water discharging sections 54. The branch water feeding pipes 57 are disposed in a space S formed between the vertical wall portion 50 and the rear side wall 21c located on the side opposite to the side where the blades 22R, 22C, 22L are located, relative to the vertical wall portion 50.

Figure 5:
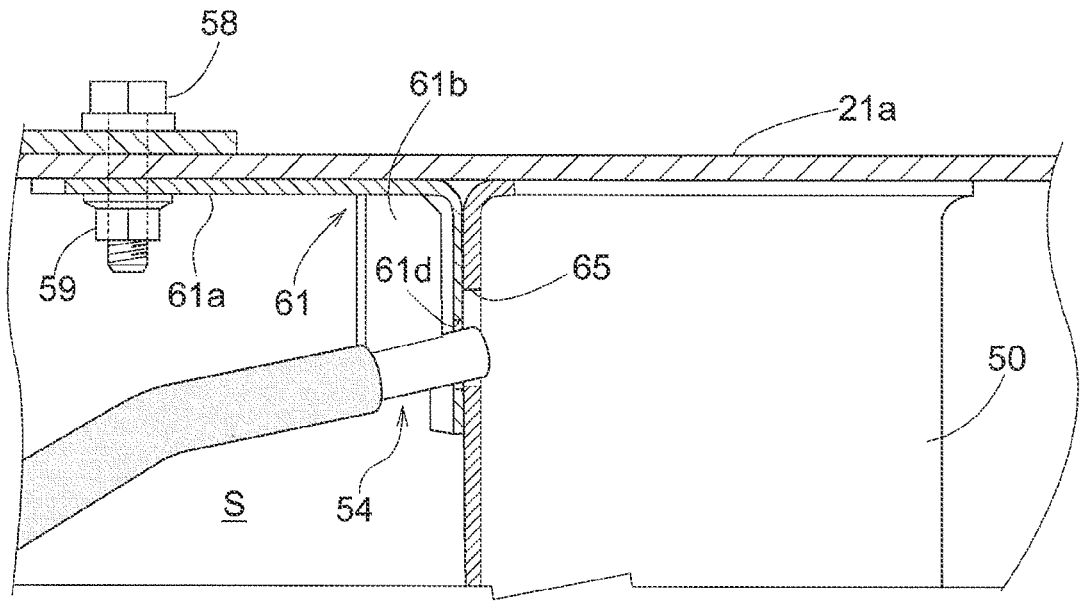
FIG. 5 is a side view in horizontal section of a water discharging section.

FIG. 5 shows an attachment portion for the water discharging sections 54. Each water discharging section 54, as being fitted in a through hole 65 defined in each one of the arcuate portions 50R, 50C, 50L, is provided at a position located in the space S formed between the vertical wall portion 50 and the rear side wall 21c located on the side opposite to the side where the blades 22R, 22C, 22L are located, relative to the vertical wall portion 50.

As shown in FIG. 4 and FIG. 5, the water discharging section 54 is supported to the housing 21 via the support member 61. The support member 61 includes an L-shaped abutment member 61a placed in abutment against the ceiling wall 21a and the vertical wall portion 50 and a perpendicular member 61b extending perpendicularly from the abutment member 61a. The abutment member 61a extends downwards from the portion of this abutment member 61a placed in contact with the ceiling wall 21a. The water discharging section 54, as being fitted in the through hole 65 defined at the portion of the abutment member 61a opposed to the vertical wall portion 50, is supported to the lower end portion of the perpendicular member 61b.

At the portion of the abutment member 61a placed in abutment against the ceiling wall 21a, an elongate hole 61c is formed. The water discharging section 54 is fastened and fixed by a bolt 58 inserted in the elongate hole 61c and a fastening hole (not shown) defined in the ceiling wall 21a and a nut 59. With this arrangement, the water discharging section 54 is posture-adjustable within the hole range of the elongate hole 61c.

Each water discharging section 54 is supported with an inclination such that the water discharging section 54 approaches the ceiling wall 21a as extending toward the water discharging outlet. And, the water discharging sections 54 discharge cleaning water at least to the portions of the ceiling wall 21a overlapped with the rotational trajectories TR, TC, TL (see FIG. 4) of the blades 22R, 22C, 22L as seen in a plan view.

As shown in FIG. 4, for instance, if cleaning water is fed to the water feeding section 53 by connecting an unillustrated hose from a water tap to the water feeding section 53 will flow through the water feeding pipe 55 to be fed to the water discharging sections 54 and discharged toward the ceiling wall 21a from the lateral direction to the inner wall face of the ceiling wall 21a of the housing 21. Incidentally, in case the cleaning water is discharged while the blades 22R, 22C, 22L are being rotated, the cleaning water will drop from the ceiling wall 21a onto the blades 22R, 22C, 22L and can remove cut grass pieces or the like adhering around the respective drive shafts 27R, 27C, 27L and cut grass pieces of the like adhering to the inner face of the housing 21 in an efficient manner.

OTHER EMBODIMENTS

Next, other embodiments having modifications made to the foregoing embodiment will be explained. The following other embodiments may be applied in a plurality of combinations to the foregoing embodiment, unless any contradiction results from such combining. Incidentally, the scope of the present invention is not limited to the contents of the respective embodiments.

(1) In the foregoing embodiment, there was explained an example in which cleaning water is discharged to the inner wall face of the ceiling wall 21a of the housing 21. However, it may be any inner wall face of the housing 21. For instance, the water may be discharged to the inner wall face of the front side wall 21b or the corner portion at the border between the inner wall face of the ceiling wall 21a and the inner wall face of the front side wall 21b. Further, the water discharging section 54 may be configured to discharge cleaning water to the vertical wall portion 50.

(2) In the foregoing embodiment, there was explained an example in which the vertical wall portion 50 is provided on the inner rear side of the housing 21. However, the present invention is not limited to the foregoing embodiment. For instance, the vertical wall portion 50 may be provided on the inner rear side of the housing 21. In this case, the water discharging sections 54 and the branch water feeding pipes 57 may be disposed at portions located in the space formed between the vertical wall portion 50 and the front side wall 21b of the housing 21. Further alternatively, the housing 21 may omit the vertical wall portion 50.

Figure 7:
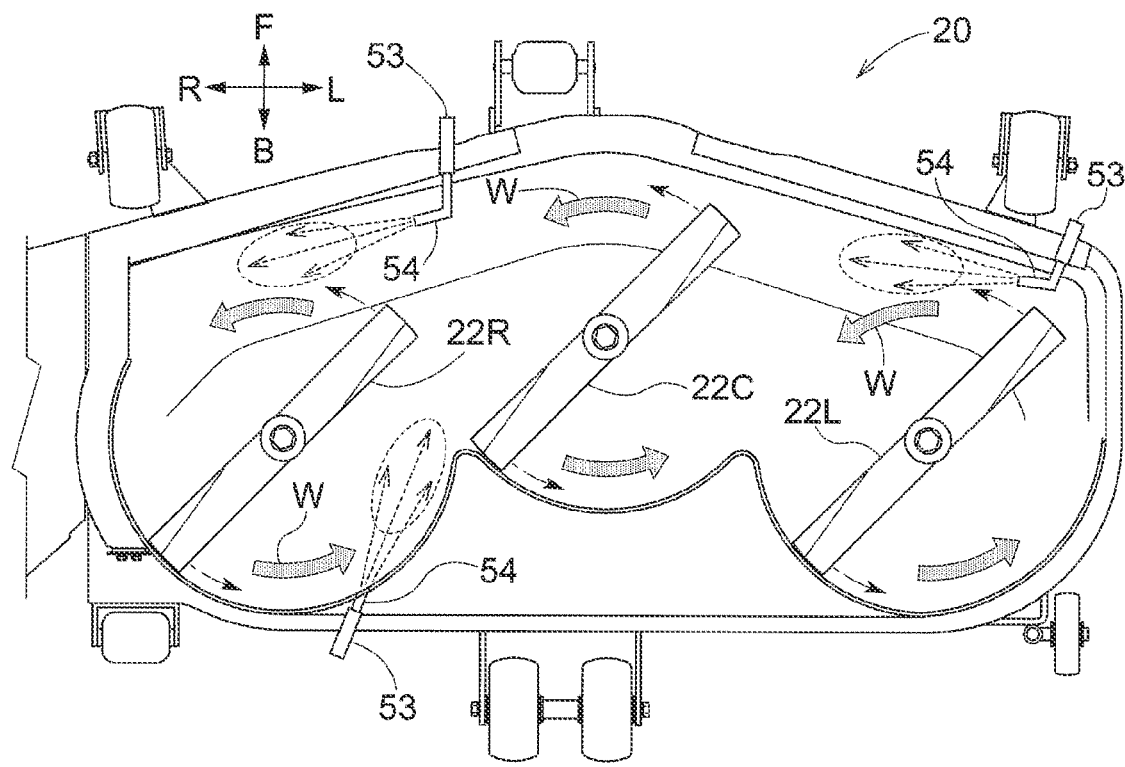
FIG. 7 is a lower side view showing an arrangement of a mower unit according to a further embodiment.

(3) In the foregoing embodiment, there was explained an example in which the cleaning device 52 includes the water feeding section 53, the water feeding pipe 55 and the water discharging sections 54. However, the present invention is not limited to the foregoing embodiment. For instance, as shown in FIG. 7, the cleaning device 52 may be configured such that each one of the plurality of water discharging sections 54 includes a water feeding section 53. Further, as shown in FIG. 7, the water discharging section 54 may be configured to discharge water in the direction along the direction of wind generated by the rotations of the blades 22R, 22C, 22L.

Figure 8:
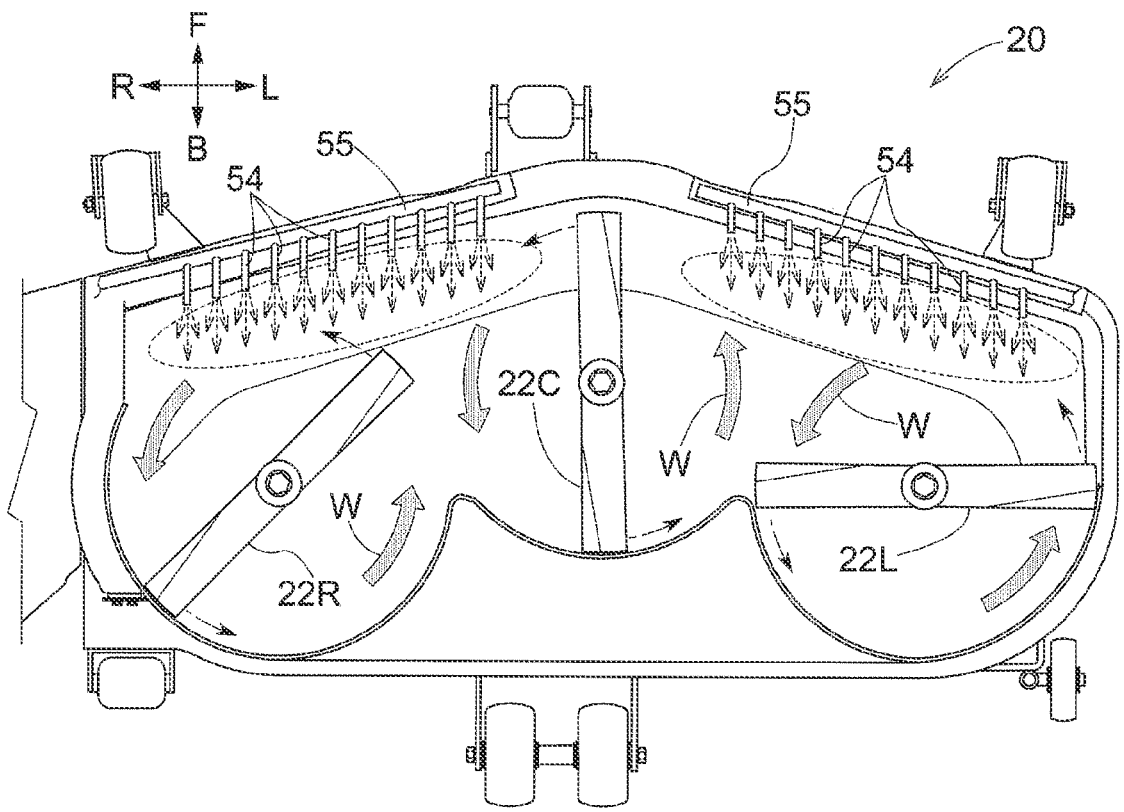
FIG. 8 is a lower side view showing an arrangement of a mower unit according to a further embodiment.

(4) In the foregoing embodiment, there was explained an example in which the main water feeding pipe 56 is provided with the plurality of water discharging sections 54 via the branch water feeding pipes 57. However, as shown in FIG. 8, a large number of water discharging sections 54 may be provided directly in the main water feeding pipe 56. In this case, the arrangement may be provided with a plurality of water feeding sections 53.

(5) In the foregoing embodiment, there was explained an example in which the water feeding section 53 is disposed upwardly of the housing 21 and at a position on the left side in the width direction of the housing 21. However, the present invention is not limited to the foregoing embodiment. For instance, the water feeding section 53 may be disposed on the left side or the center side in the width direction of the housing 21 or may be disposed on the lateral outer side of the housing 21.

(6) In the foregoing embodiment, there was explained an example in which the protection portion 40 includes the first protection member 40a and the second protection member 40b. However, the present invention is not limited to the foregoing embodiment. For instance, the protection portion 40 may be constituted of a single member having a cylindrical shape and an opened upper portion, and the water feeding section 53 may be disposed at the center portion of the cylinder. Further alternatively, the protection portion 40 may be omitted at all. Further alternatively, a plurality of water feeding sections 53 may be provided. In this case, each water feeding section 53 may be provided with a protection portion 40.

(7) In the foregoing embodiment, there was explained an example in which three blades are provided. However, two or fewer blades, or four or more blades may be provided. And, in such case, the number of the water discharging sections 54, the number of branch connecting portions 56c and the number of branch water feeding pipes 57 may be different from the number of the blades.

(8) In the foregoing embodiment, there was explained an example in which each one of the water discharging sections 54 is supported with an inclination to approach the ceiling wall 21a at it extends toward the water discharging outlet, thereby to discharge cleaning water toward the ceiling wall 21a. However, the present invention is not limited to the foregoing embodiment. For instance, the water discharging section 54 may be disposed parallel with the wall face of the ceiling wall 21a, whereas the water discharging outlet of the water discharging section 54 may be opened in the obliquely upward direction so as to discharge the cleaning water toward the ceiling wall 21a.

Figure 9:
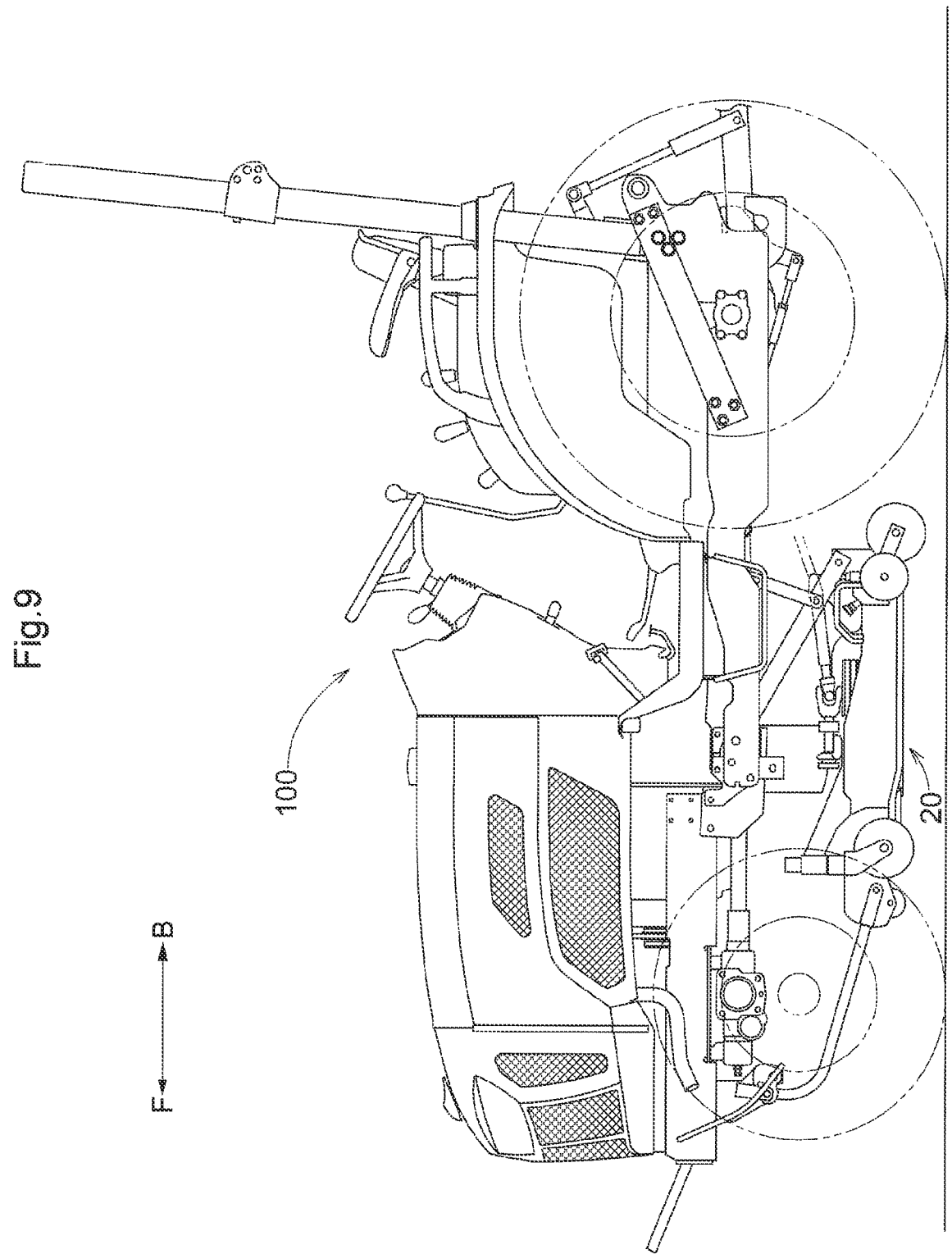
FIG. 9 is an overall side view of a riding grass mowing machine according to a further embodiment.

(9) In the foregoing embodiment, there was explained an example in which the mower unit 20 according to the present invention is mounted to a zero-turn mower as a "riding grass mowing machine". However, the present invention is not limited to the foregoing embodiment. For instance, as shown in FIG. 9, the mower unit 20 relating to the present invention may be mounted to a tractor 100.

INDUSTRIAL APPLICABILITY

The present invention is not limited to the mower being configured as a side-discharge type, but may be configured as a mulching-type or a rear-discharge type, and so on.

DESCRIPTION OF SIGNS

20: mower unit
21: housing
22L, 22C, 22R: blade
40: protection portion
40a: first protection member
40b: second protection member
50: vertical wall portion 53: water feeding section
54: water discharging section
55: water feeding pipe
56: main water feeding pipe
57: branch water feeding pipe
56c: branch connecting portion
S: sp ace
TC, TL,TR: rotational trajectory
XL, XC, XR: rotational axis

The invention claimed is:

1. A mower unit comprising:
a blade rotatably driven about a rotational axis to be able to cut grass on the ground surface;
a housing covering the blade and having an open lower face;
a water feeding section provided outside the housing;
a water discharging section provided inside the housing for discharging cleaning water fed to the water feeding section; and
a water feeding pipe connected between the water feeding section and the water discharging section,
wherein the water discharging section discharges water toward an inner wall face of the housing,
wherein, inside the housing, there is provided a vertical wall portion having an arcuate shape along an outer shape of a rotational trajectory of the blade,
wherein the water discharging section is provided at a portion located in a space formed between the vertical wall portion and a lateral wall of the housing located on the side opposite the side where the blade is located,
wherein the water feeding pipe includes a main water feeding pipe connected to the water feeding section and a branch water feeding pipe branching from the main water feeding pipe and connected to the water discharging section,
wherein the branch water feeding pipe is disposed in the space,
wherein in an outer wall face of the housing, there is provided a protection portion for protecting the water feeding section, and
wherein an upper end of the protection portion is higher than an upper end of the water feeding section.

2. The mower unit of claim 1, wherein the water discharging section discharges water toward a ceiling face of the inner wall face.

3. The mower unit of claim 1, wherein the water discharging section discharges water toward at least a portion of the inner wall face overlapped with the rotational trajectory of the blade as viewed in a plan view.

4. The mower unit of claim 1, wherein:
the main water feeding pipe includes a branch connecting portion formed integrally with the main water feeding pipe, to which the branch water feeding pipe is connected; and
the branch connecting portion is provided under an inclined state progressively away from the main water feeding pipe from a branching point toward a downstream side in a water flowing direction of the main water feeding pipe.

5. The mower unit of claim 1, wherein the water feeding section is provided upwardly of the housing and on one side in a width direction of the housing.

6. The mower unit of claim 5, wherein:
the protection portion includes a first protection member and a second protection member disposed adjacent the water feeding section;
the first protection member and the second protection member are disposed such that the water feeding section is located between the first protection member and the second protection member as viewed in a plan view; and
heights of upper ends of the first protection member and the second protection member are higher than a height of an upper end of the water feeding section.

7. The mower unit of claim 1, wherein the water feeding section is configured to discharge water toward the direction along a flowing direction of air current generated in association with rotation of the blade.

8. The mower unit of claim 1, wherein:
there is provided a support member for supporting the water discharging section to the housing; and
the support member has an elongate hole for insertion of a bolt for fixing and fastening the support member to the housing, the support member being adjustable in a posture within the range of the hole of the elongate hole.

9. The mower unit of claim 1, wherein the water feeding section is provided in a front side wall of the housing.

10. A mower unit comprising:
a blade rotatably driven about a rotational axis to be able to cut grass on the ground surface;
a housing covering the blade and having an open lower face;
a water feeding section provided outside the housing;
a water discharging section provided inside the housing for discharging cleaning water fed to the water feeding section; and
a water feeding pipe connected between the water feeding section and the water discharging section,
wherein the water discharging section discharges water toward an inner wall face of the housing,
wherein, inside the housing, there is provided a vertical wall portion having an arcuate shape along an outer shape of a rotational trajectory of the blade,
wherein the water discharging section is provided at a portion located in a space formed between the vertical wall portion and a lateral wall of the housing located on the side opposite the side where the blade is located,
wherein the water feeding pipe includes a main water feeding pipe connected to the water feeding section and a branch water feeding pipe branching from the main water feeding pipe and connected to the water discharging section,
wherein the branch water feeding pipe is disposed in the space, and
wherein in an outer wall face of the housing, there is provided a protection portion for protecting the water feeding section, the protection portion including two bar-like members both disposed on one side in a width direction of the housing.

* * * * *